United States Patent
Lee et al.

(10) Patent No.: US 9,609,684 B2
(45) Date of Patent: Mar. 28, 2017

(54) APPARATUS AND METHOD FOR TRANSMITTING/RECEIVING DATA IN MOBILE CONTENT NETWORK

(71) Applicant: Samsung Electronics Co., Ltd., Suwon-si, Gyeonggi-do (KR)

(72) Inventors: Chul-Ki Lee, Seoul (KR); Jung-Shin Park, Seoul (KR); Yeong-Moon Son, Yongin-si (KR); Antony Franklin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 269 days.

(21) Appl. No.: 14/304,476

(22) Filed: Jun. 13, 2014

(65) Prior Publication Data
US 2014/0369259 A1    Dec. 18, 2014

(30) Foreign Application Priority Data

Jun. 14, 2013  (KR) .................. 10-2013-0068180

(51) Int. Cl.
| | |
|---|---|
| *H04W 76/04* | (2009.01) |
| *H04L 29/06* | (2006.01) |
| *H04L 29/08* | (2006.01) |
| *H04W 40/02* | (2009.01) |
| *H04W 40/20* | (2009.01) |

(52) U.S. Cl.
CPC ......... *H04W 76/04* (2013.01); *H04L 65/4084* (2013.01); *H04L 67/2842* (2013.01); *H04W 40/02* (2013.01); *H04W 40/20* (2013.01)

(58) Field of Classification Search
CPC ..... H04W 40/02; H04W 76/04; H04W 40/20; H04L 65/4084; H04L 67/2842
USPC ........................................... 370/328
See application file for complete search history.

(56) References Cited

U.S. PATENT DOCUMENTS 6,138,162 A * 10/2000 Pistriotto ............... H04L 29/06
                                                                 709/218
6,799,214 B1 * 9/2004 Li ..................... G06F 17/30902
                                                              707/E17.12
7,080,158 B1    7/2006 Squire
(Continued)

OTHER PUBLICATIONS

R. Stewart, Huawei, P. Lei; Cisco Systems, Inc; M. Tuexen, Muenster Univ. of Applied Sciences, Mar. 29, 2011. Network Working Group, Internet-Draft , Intended status: Informational, Expires: Sep. 30, 2011. "Uses of Stream Reconfiguration for SCTP draft-stewart-tsvwg-reconfuse-sctp-00.txt". Stewart et al.; Mar. 29, 2011.*

(Continued)

*Primary Examiner* — Jae Y Lee
(74) *Attorney, Agent, or Firm* — Jefferson IP Law, LLP

(57) ABSTRACT

A method for receiving data in a User Equipment (UE) in a mobile content network is provided. The method includes transmitting a request message, which requests a content, to a first Digital Unit (DU), receiving an Internet Protocol (IP)_ADD message, including information of a second DU which caches the content, from the first DU, updating a Stream Control Transmission Protocol (SCTP) connection according to the information of the second DU included in the IP_ADD message, and receiving data from the second DU using the updated SCTP connection.

36 Claims, 8 Drawing Sheets

(56) References Cited

U.S. PATENT DOCUMENTS

| | | | |
|---|---|---|---|
| 2003/0174648 A1* | 9/2003 | Wang | H04L 65/1013 370/235 |
| 2005/0149754 A1* | 7/2005 | Rasanen | H04L 29/12066 726/4 |
| 2006/0164974 A1* | 7/2006 | Ramalho | H04L 29/06027 370/219 |
| 2008/0126535 A1* | 5/2008 | Zhu | H04L 67/18 709/224 |
| 2010/0218034 A1 | 8/2010 | Sirigiri et al. | |
| 2010/0250757 A1* | 9/2010 | Akhter | H04L 67/1002 709/229 |
| 2011/0019547 A1* | 1/2011 | De Lutiis | H04L 29/12207 370/231 |
| 2011/0231475 A1* | 9/2011 | Van Der Merwe | H04L 29/12066 709/203 |
| 2012/0218970 A1 | 8/2012 | Westberg et al. | |
| 2013/0208621 A1* | 8/2013 | Manghirmalani | H04L 45/44 370/254 |
| 2014/0341109 A1* | 11/2014 | Cartmell | H04L 45/308 370/328 |
| 2014/0362712 A1* | 12/2014 | Agarwal | H04W 28/0236 370/252 |

OTHER PUBLICATIONS

XP015075087 "Uses of Stream Reconfiguration for SCTP; draft-stewart-tsvwg-reconfuse-sctp-OO.txt", Mar. 29, 2011.
XP019022051 "Web Agent Supporting Transport Layer Mobility", Jan. 1, 2005.

\* cited by examiner

APPARATUS AND METHOD FOR TRANSMITTING/RECEIVING DATA IN MOBILE CONTENT NETWORK

CROSS-REFERENCE TO RELATED APPLICATION(S)

This application claims the benefit under 35 U.S.C. §119(a) of a Korean patent application filed on Jun. 14, 2013 in the Korean Intellectual Property Office and assigned Serial number 10-2013-0068180, the entire disclosure of which is hereby incorporated by reference.

TECHNICAL FIELD

The present disclosure relates to an apparatus and method for transmitting and receiving data in a mobile content network.

BACKGROUND

As the Internet has evolved, various schemes to take advantage of its capabilities have been proposed. A typical example of the various schemes is a content delivery network scheme. Here, the content delivery network scheme will be described below.

In a case that the content delivery network scheme is used, if a User Equipment (UE) requests a content, a node which caches the content should be searched. In order to search the node which caches the content, a Hyper Text Transfer Protocol (HTTP) redirection scheme is used, and the HTTP redirection scheme will be described below.

If the UE uses the HTTP redirection, the UE transmits an HTTP request message to a related node. The HTTP request message indicates that a subject that transmits the HTTP request message requests a content. After receiving the HTTP request message, the related node determines whether the related node caches the content, and transmits an HTTP redirection message to the UE which requested the content if the related node does not cache the content. The HTTP redirection message indicates that the UE will request the content through other node if the subject that transmits the HTTP redirection message does not cache the content, and includes information on a server which is connected to the node which transmits the HTTP redirection message. The information on the server may include information such as an Internet Protocol (IP) address of the server and the like, and a detailed description thereof will be omitted herein.

The UE detects the information on the server included in the HTTP redirection message which is received from the related node, and searches the server corresponding to the detected information on the server again. The UE accesses the searched server. The UE transmits an HTTP request message which requests the content of the accessed server again.

The UE repeats the aforementioned operations, i.e., an operation of transmitting an HTTP request message to a specific node, an operation of receiving an HTTP redirection message from the specific node, an operation of accessing a related server by detecting information on the related server included in the HTTP redirection message, and an operation of transmitting an HTTP request message to the accessed server again, until the UE detects a node which caches the requested content.

The related node which caches the content transmits the content to the UE through the aforementioned operation, so the UE may receive the content which the related node transmits.

If the HTTP redirection scheme is used, a process of establishing a Transmission Control Protocol (TCP) connection should be performed before related nodes transmit an HTTP message. That is, whenever accessing a new host using the HTTP redirection scheme, the new host and the UE establish a new TCP connection, and the UE may transmit an HTTP request message after establishing the new TCP connection.

This TCP connection establishment with the new host becomes overhead to both the mobile content network and the UE, and results in service delay. More particularly, if files which have a relatively small capability, such as an image, are transmitted, the overhead due to the TCP connection establishment is greater than due to actual data transmission.

Thus, there is a need for a scheme of receiving a content without a new TCP connection establishment whenever a UE searches a new host in a mobile content network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting/receiving data in a mobile content network.

Another aspect of the present disclosure is to provide an apparatus and method for transmitting/receiving a content without establishing a new Transmission Control Protocol (TCP) connection whenever a User Equipment (UE) searches a new host in a mobile content network.

Another aspect of the present disclosure is to provide an apparatus and method for transmitting/receiving data, thereby decreasing an overhead cost in a mobile content network.

Another aspect of the present disclosure is to provide an apparatus and method for transmitting/receiving data, thereby preventing a service delay in a mobile content network.

Another aspect of the present disclosure is to provide an apparatus and method for transmitting/receiving data, thereby increasing a content download speed in a mobile content network.

In accordance with an aspect of the present disclosure, a method for receiving data in a UE in a mobile content network is provided. The method includes transmitting a request message, which requests a content, to a first Digital Unit (DU), receiving an Internet Protocol (IP) ADD message, including information of a second DU which caches the content, from the first DU, updating a Stream Control Transmission Protocol (SCTP) connection according to the information of the second DU included in the IP_ADD message, and receiving data from the second DU using the updated SCTP connection.

In accordance with another aspect of the present disclosure, a method for transmitting data in a first DU in a mobile content network is provided. The method includes receiving a request message, which requests a content, from a UE, determining whether the first DU currently caches the content which the UE requests, routing the request message to a second DU, as a DU which is expected to cache the content which the UE requests, if the first DU does not cache the content which the UE requests, and transmitting an IP_ADD message including information of the second DU to the UE.

In accordance with another aspect of the present disclosure, a method for transmitting data in a second DU in a mobile content network is provided. The method includes receiving a request message, which requests a content, from a first DU which receives the request message from a UE, determining whether the second DU currently caches the content which the UE requests, and transmitting the content which the UE requests to the UE if the second DU caches the content which the UE requests.

In accordance with another aspect of the present disclosure, a UE in a mobile content network is provided. The UE includes a transmitter configured to transmit a request message, which requests a content, to a first DU, a receiver configured to receive an IP_ADD message, including information of a second DU which caches the content, from the first DU, and a controller configured to update a SCTP connection according to the information of the second DU included in the IP_ADD message, wherein the receiver receives data from the second DU using the updated SCTP connection.

In accordance with another aspect of the present disclosure, a first DU in a mobile content network is provided. The first DU includes a receiver configured to receive a request message, which requests a content, from a UE, a controller configured to determine whether the first DU currently caches the content which the UE requests, a controller configured to route the request message to a second DU, as a DU which is expected to cache the content which the UE requests, if the first DU does not cache the content which the UE requests, and to transmit an IP_ADD message including information of the second DU to the UE.

In accordance with another aspect of the present disclosure, a second DU in a mobile content network is provided. The second DU includes a receiver configured to receive a request message, which requests a content, from a first DU which receives the request message from a UE, a controller configured to determine whether the second DU currently caches the content which the UE requests, and a transmitter configured to transmit the content which the UE requests to the UE if the second DU caches the content which the UE requests.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
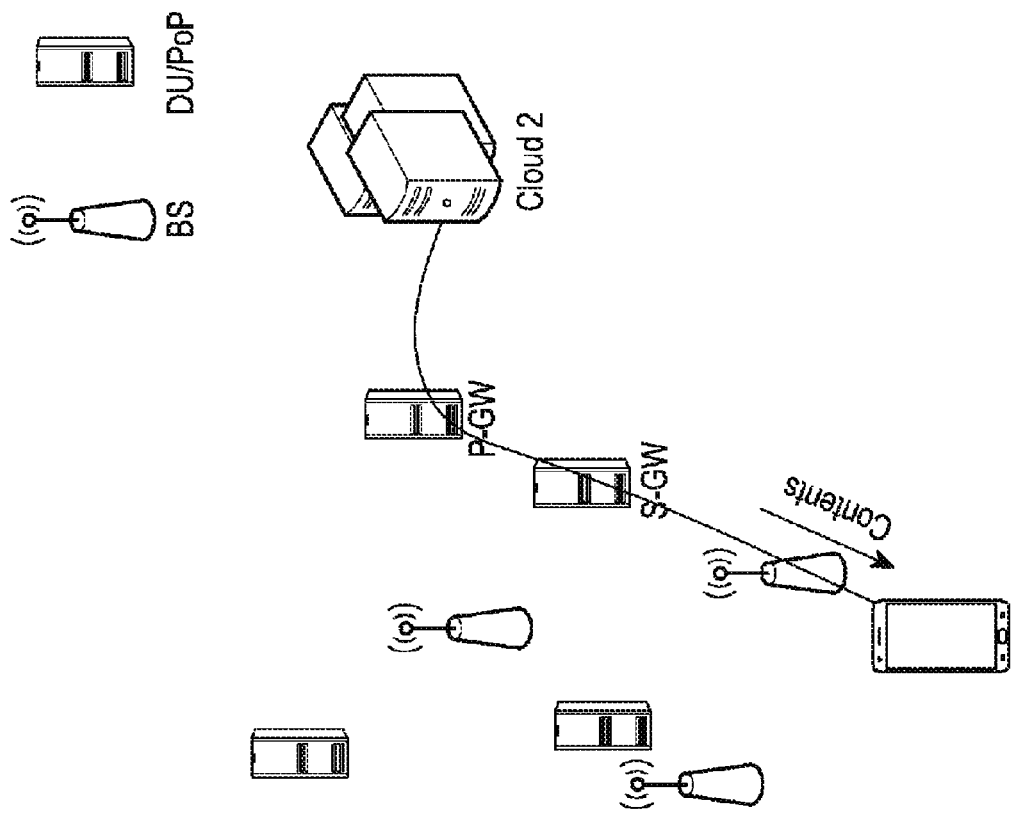
FIG. 1 schematically illustrates a structure of a mobile content network according to an embodiment of the present disclosure.
Figure 1:
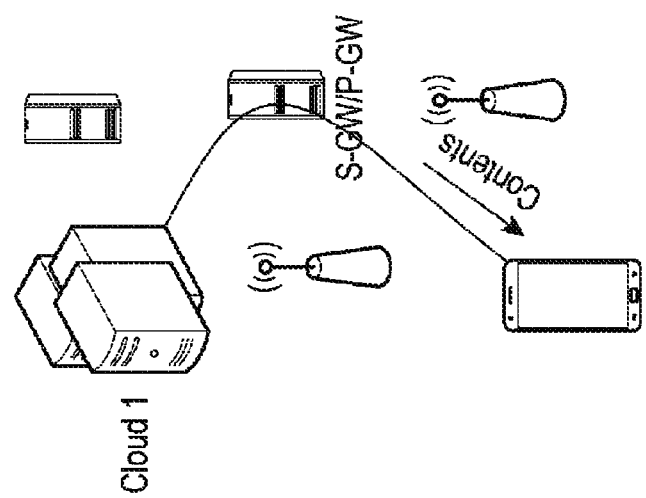

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure provides an apparatus and method for transmitting/receiving data in a mobile content network.

An embodiment of the present disclosure provides an apparatus and method for selecting/changing a Serving-GateWay (S-GW) in a mobile content network.

An embodiment of the present disclosure provides an apparatus and method for selecting/changing an S-GW which caches a content in a mobile content network.

An embodiment of the present disclosure provides an apparatus and method for transmitting/receiving data thereby receiving a content without establishing a new Transmission Control Protocol (TCP) connection whenever a User Equipment (UE) searches a new host in a mobile content network.

An embodiment of the present disclosure provides an apparatus and method for transmitting/receiving data thereby decreasing overhead in a mobile content network.

An embodiment of the present disclosure provides an apparatus and method for transmitting/receiving data thereby preventing service delay in a mobile content network.

An embodiment of the present disclosure provides an apparatus and method for transmitting/receiving data thereby increasing a content download speed in a mobile content network.

A method and apparatus provided in various embodiments of the present disclosure may be applied to various communication systems such as a Long Term Evolution (LTE) system, an LTE-Advanced (LTE-A) system, a High Speed Downlink Packet Access (HSDPA) mobile communication system, a High Speed Uplink Packet Access (HSUPA) mobile communication system, a High Rate Packet Data (HRPD) mobile communication system proposed in a $3^{rd}$ Generation Project Partnership 2 (3GPP2), a Wideband Code Division Multiple Access (WCDMA) mobile communication system proposed in the 3GPP2, a Code Division Multiple Access (CDMA) mobile communication system proposed in the 3GPP2, an Institute of Electrical and Electronics Engineers (IEEE) mobile communication system, an Evolved Packet System (EPS), a Mobile Internet Protocol (Mobile IP) system, and/or the like.

FIG. 1 schematically illustrates a structure of a mobile content network according to an embodiment of the present disclosure.

Referring to FIG. 1, a mobile content network in FIG. 1 is a mobile content network in a case that a content caching node is deployed within a mobile communication network.

If a UE requests a content, the content request of the UE is transmitted to a node which caches the content through intermediate procedures. The node caches the content which the UE requests, and transmits the content to the UE. The UE downloads the content from the node which caches the content which the UE requests. In this case, even though the UE moves from a first location to another location, the UE still downloads the content from the same node. The node which caches the content acts as an anchor for the content. Here, the node which acts as the anchor is an S-GW, so each content which the UE downloads has a form in which the S-GW is designated.

However, a message which requests a content according to a content request of a UE will be transmitted to an S-GW which the UE currently recognizes. In this case, it is not guaranteed that the S-GW has the content which the UE requests, i.e., the content which the UE wants to download.

So, the UE should be connected to an S-GW which may provide the content which the UE requests to the UE. This case is somewhat similar to a case which occurs in a Content Delivery Network (CDN) scheme which is used in the internet.

A process of transmitting a content in a mobile content network according to the related art will be described with reference to FIG. 2.

Figure 2:
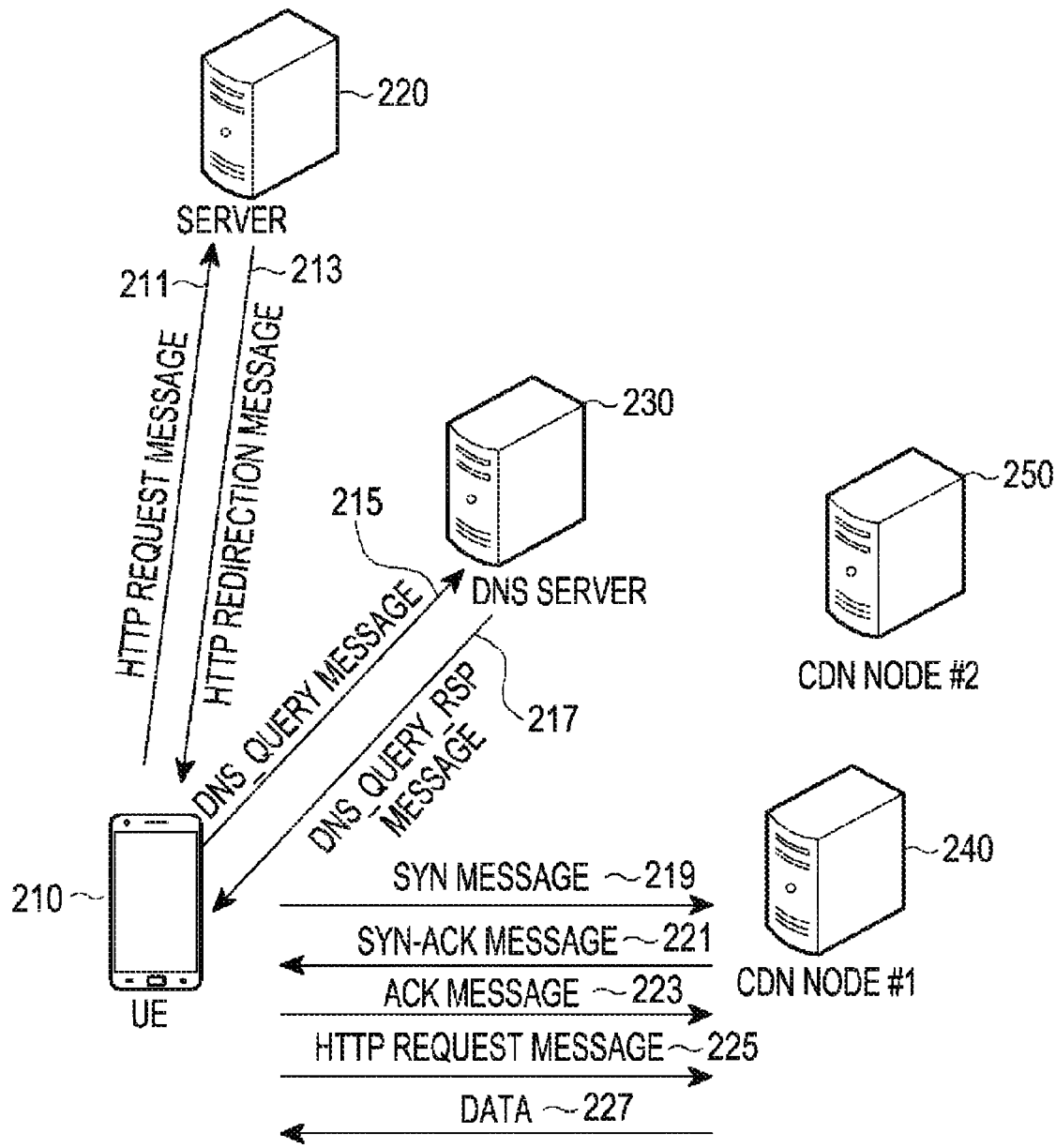
FIG. 2 schematically illustrates a process of transmitting a content in a mobile content network according to the related art.

FIG. 2 schematically illustrates a process of transmitting a content in a mobile content network according to the related art.

Referring to FIG. 2, the mobile content network includes a UE 210, a server 220, a Domain Name System (DNS) server 230, a CDN node #1 240, and a CDN node #2 250.

When the UE 210 wants to receive an arbitrary content in a state that the UE 210 accesses the server 220, the UE 210 transmits a Hyper Text Transfer Protocol (HTTP) request message, indicating that the UE 210 requests the content, to the server 220 in operation 211. The HTTP request message indicates that a subject, i.e., the UE 210, which transmits the HTTP request message requests the content.

After receiving the HTTP request message, the server 220 determines whether the server 220 currently caches the content which the UE 210 requests, and either transmits an HTTP redirection message to the UE 210 or transmits the content which the UE 210 requests to the UE 210 according to the determining result. In FIG. 2, it will be assumed that the server 220 does not currently cache the content which the UE 210 requests. The server 220 thus transmits the HTTP redirection message to the UE 210 in operation 213. The HTTP redirection message indicates that there is a need for content request to another node, since the node which transmits the HTTP redirection message does not currently cache the content, and includes information on a server which is expected to cache the content which the UE 210 requests. The information on the server which is expected to cache the content which the UE 210 requests included in the HTTP redirection message may be a domain name of the server, and a detailed description will be omitted herein. In FIG. 2, it will be assumed that the information on the server which is expected to cache the content which the UE 210 requests included in the HTTP redirection message is a domain name of the CDN node #1 240.

After receiving the HTTP redirection message from the server 220, the UE 210 transmits a DNS_query message to the DNS server 230 in operation 215. The DNS_query message includes information on a server which is expected to cache the content which the UE 210 requests, i.e., a domain name of the CDN node #1 240.

After receiving the DNS_query message from the UE 210, the DNS server 230 analyzes the domain name of the CDN node #1 240 included in the DNS_query message to detect an Internet Protocol (IP) address corresponding to the domain name of the CDN node #1 240. The DNS server 230 transmits a DNS_query_ReSPonse (DNS_query_RSP) message including the detected IP address of the CDN node #1 240 in operation 217. The UE 210 may thus acquire an IP address of another server through which the UE 210 will receive the content, in operations 215 to 217.

After receiving the DNS_query_RSP message from the DNS server 230, the UE 210 may detect the IP address of the CDN node #1 240 as a server which caches the content, and intends to access a new server, i.e., the CDN node #1 240, using the IP address of the CDN node #1 240. The UE 210 transmits a SYNchronization (SYN) message to the CDN node #1 240 in operation 219. After receiving the SYN message from the UE 210, the CDN node #1 240 transmits a SYNchronization ACKnowledgement (SYN-ACK) message as a response message to the SYN message to the UE 210 at operation 221. After receiving the SYN-ACK message from the CDN node #1 240, the UE 210 transmits an ACKnowledgement (ACK) message as a response message to the SYN-ACK message to the CDN node #1 240 at operation 223. Here, a process of operations 219 to 223 is a Transmission Control Protocol (TCP) access process, i.e., a process of establishing a TCP connection.

After transmitting the ACK message to the CDN node #1 240, the UE 210 is connected to the CDN node #1 240, so the UE 210 transmits an HTTP request, message which requests a related content, to the CDN node #1 240 at operation 225. After receiving the HTTP request message from the UE 210, the CDN node #1 240 determines whether the CDN node #1 240 caches the requested content, and transmits either an HTTP redirection message or the content which the UE 210 requests to the UE 210, according to the determining result. In FIG. 2, it will be assumed that the CDN node #1 240 caches the content which the UE 210 requests. So, the CDN node #1 240 transmits data, which the CDN node #1 240 caches, to the UE 210 at operation 227.

The UE 210 repeats the aforementioned operations, i.e., an operation of transmitting an HTTP request message to a specific node, an operation of receiving an HTTP redirection message from the specific node, an operation of accessing a related server by detecting information on the related server included in the HTTP redirection message, and an operation of transmitting an HTTP request message to the accessed server again, until the UE detects a node which caches the requested content.

Referring to FIG. 2, the CDN node #1 240 caches the content which the UE 210 requests, so a TCP access process to a new host, i.e., a TCP connection establishment process to the new host, is performed one time. However, if the CDN node #1 240 does not cache the content which the UE 210 requests, the UE 210 may perform the TCP access process with another host again.

This TCP access process to the new host becomes overhead to both the mobile content network and the UE 210, and results in a service delay. More particularly, if files which have a relatively small capability, such as an image, are transmitted, the overhead due to the TCP access process may have a greater cost than the actual data transmission.

An embodiment of the present disclosure provides a new content transmitting method without establishing a new TCP connection and transmitting an HTTP request message for content request whenever a UE searches a new host in a mobile content network. An example of a process of transmitting a content in a mobile content network according to an embodiment of the present disclosure will be described with reference to FIG. 3.

Figure 3:
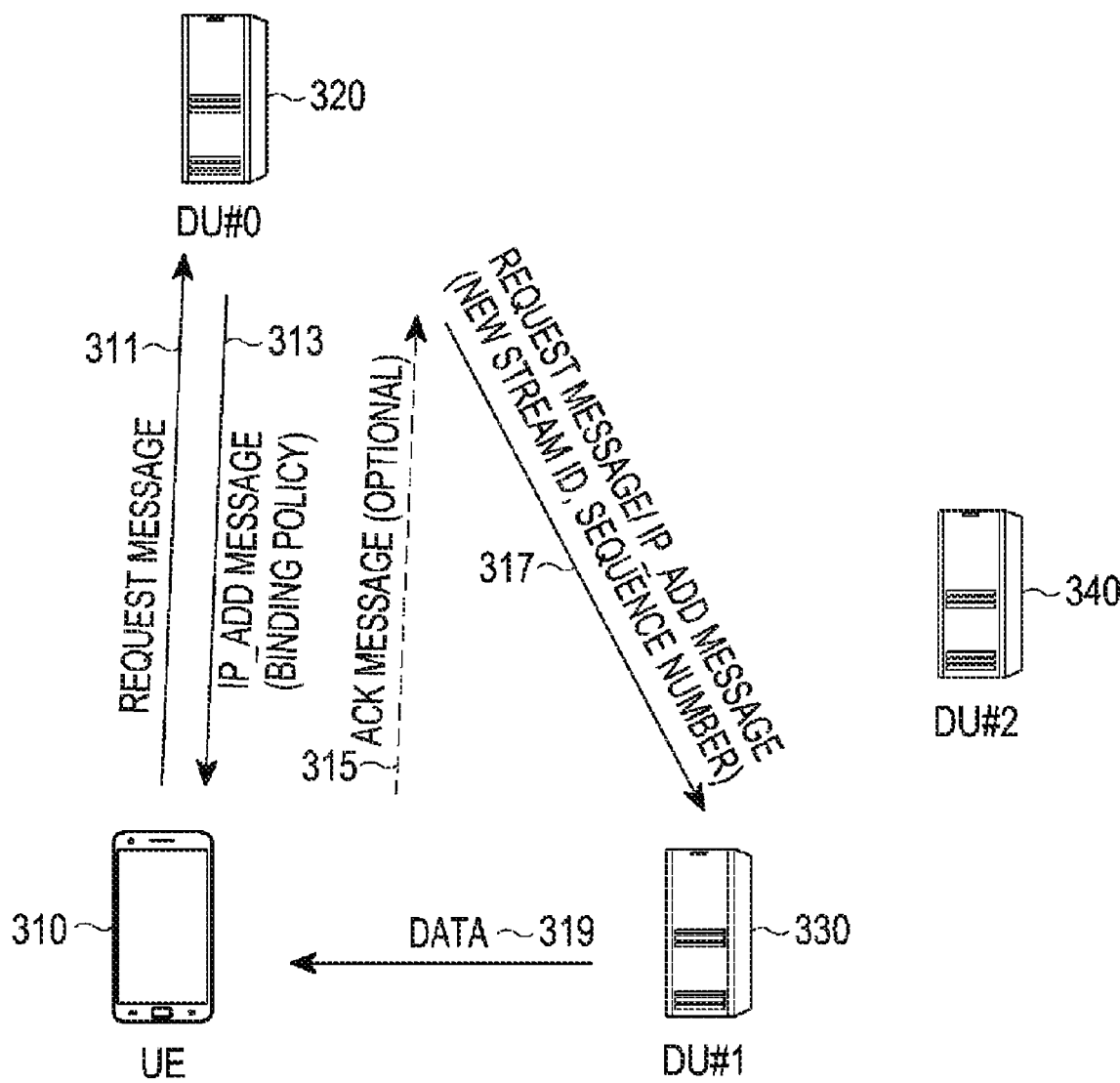
FIG. 3 schematically illustrates an example of a process of transmitting a content in a mobile content network according to an embodiment of the present disclosure.

FIG. 3 schematically illustrates an example of a process of transmitting a content in a mobile content network according to an embodiment of the present disclosure.

Referring to FIG. 3, the mobile content network includes a UE 310, a Digital Unit (DU) #0 320, a DU #1 330, and a DU #2 340. Each of the DU #0 320, the DU #1 330, and the DU #2 340 may be a Serving-GateWay (S-GW) or a CDN node.

If the UE 310 wants to receive an arbitrary content in a state that the UE 310 accesses the DU #0 320, the UE 310 transmits a request message, indicating that the UE 310 requests the content, to the DU #0 320 at operation 311. After receiving the request message from the UE 310, the DU #0 320 determines whether the DU #0 320 caches the content which the UE 310 requests, and transmits either an IP_ADD message or the content which the UE 310 requests to the UE 310 according to the determining result.

Referring to FIG. 3, it will be assumed that the DU #0 320 does not cache the content which the UE 310 requests, and the DU #1 330 caches the content which the UE 310 requests. Since the DU #0 320 does not cache the content which the UE 310 requests, the DU #0 320 determines a node which will process the content request of the UE 310 by using a general content request processing scheme, e.g., a distributed hash scheme, or a table managing scheme, and the like.

The DU #0 320 includes an IP address of a DU which caches the content which the UE 310 requests, i.e., the DU #1 330, into the IP_ADD message to transmit the IP_ADD message to the UE 310 at operation 313. The IP_ADD message may include a binding policy. In this example, a connection which is used in the mobile content network is a Stream Control Transmission Protocol (SCTP) connection and not a TCP connection, so each connection may process a plurality of IP addresses.

After receiving the IP_ADD message from the DU #0 320, the UE 310 updates an SCTP connection using the IP address included in the IP_ADD message, i.e., the IP address of the DU #1 330. The UE 310 which receives the IP_ADD message from the DU #0 320 may transmit an ACK message to the IP_ADD message as necessary in operation 315, however, it will be assumed here that the UE 310 does not transmit the ACK message in response to the IP_ADD message.

After transmitting the IP_ADD message to the UE 310, the DU #0 320 transmits an IP_ADD message to the DU #1 330 at operation 317. Here, the IP_ADD message transmitted from the DU #0 320 to the DU #1 330 is a message which is transmitted in order that the DU #1 330 transmits a content to the UE 310, and includes a request message, an IP address of the UE 310, i.e., a UE_IP address, a new stream ID, and a sequence number. After receiving the IP_ADD message from the DU #0 320, the DU #1 330 uses an SCTP connection which has been established between the DU #0 320 and the DU #1 330 as an SCTP connection for data communication between the DU #1 330 and the UE 310. That is, the UE 310 may perform data communication with the DU #1 330 even though the UE 310 does not establish a new connection with the DU #1 330.

After receiving the IP_ADD message including the UE_IP address of the UE 310, the new stream ID, and the sequence number, the DU #1 330 transmits the content which the UE 310 requests to the UE 310 at operation 319.

This is why there is an assumption that it is guaranteed that the IP_ADD message at operation 313 may always reach the UE 310 earlier than data which is transmitted from the DU #1 330 to the UE 310. For reference, in a general internet, it is not guaranteed that the IP_ADD message at operation 313 may always reach the UE 310 earlier than the data which is transmitted from the DU #1 330 to the UE 310. Each of the DU #0 320 and the DU #1 330 always knows the status of the other party, and there is almost no overhead which is used for a cooperative communication between the DU #0 320 and the DU #1 330. The UE 310 and the DU #1 330 may perform a data communication using the SCTP connection which has been established between the DU #0 320 and the DU #1 330 without establishing a new connection between the UE 310 and the DU #1 330.

Referring to FIG. 3, after receiving the IP_ADD message from the DU #0 320, the UE 310 does not transmit the ACK message as a response message to the IP_ADD message. However, it will be understood by those of ordinary skill in the art that the UE 310 transmits the ACK message as the response message to the IP_ADD message after receiving the IP_ADD message from the DU #0 320 if network status of the mobile content network is not normal, so a stable data communication may be made possible.

Although FIG. 3 illustrates an example of a process of transmitting a content in a mobile content network according to an embodiment of the present disclosure, various changes could be made to FIG. 3. For example, although shown as a series of operations, various operations in FIG. 3 could overlap, occur in parallel, occur in a different order, or occur multiple times.

An example of a process of transmitting a content in a mobile content network according to an embodiment of the present disclosure has been described with reference to FIG. 3, and a signal transmitting/receiving process among a UE 310, a DU #0 320, and a DU #1 330 according to a process of transmitting a content in a mobile content network in FIG. 3 will be described with reference to FIG. 4.

Figure 4:
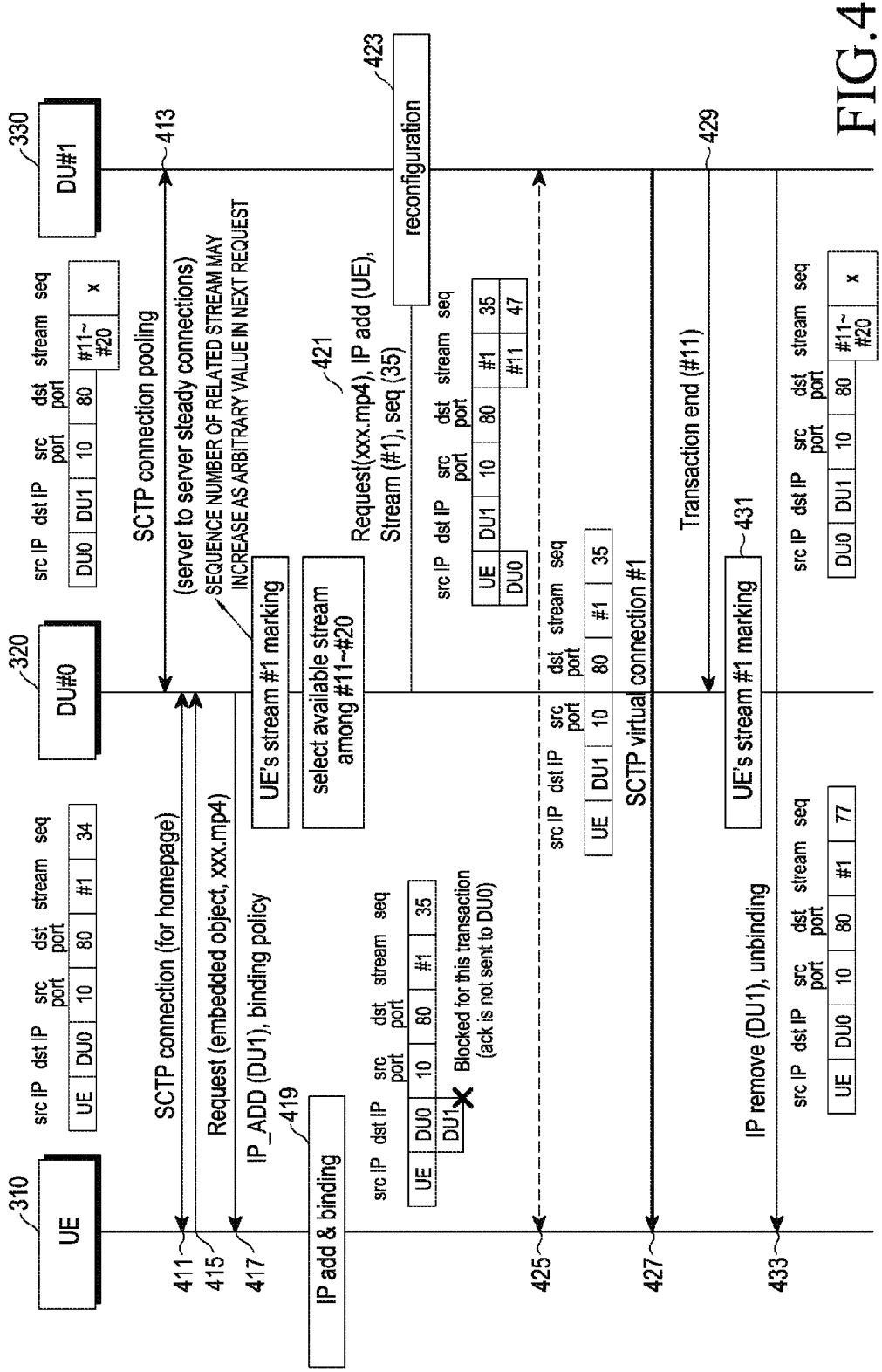
FIG. 4 schematically illustrates a signal transmitting/receiving process among a User Equipment (UE), a Digital Unit (DU), and a second DU according to a process of transmitting a content in a mobile content network in FIG. 3 according to an embodiment of the present disclosure.

FIG. 4 schematically illustrates a signal transmitting/receiving process among a UE 310, a DU #0 320, and a DU #1 330, according to a process of transmitting a content in a mobile content network in FIG. 3 according to an embodiment of the present disclosure.

Referring to FIG. 4, before a content request by the UE 310 occurs, an SCTP connection between the UE 310 and the DU #0 320 has been already established at operation 411, and an SCTP connection between the DU #0 320 and the DU #1 330 has been already established at operation 413. Since there is much information which is transmitted/received between the DU #0 320 and the DU #1 330, the DU #0 320 and the DU #1 330 will typically have a plurality streams established for mutually transmitting/receiving information. In FIG. 4, it will be assumed that there are a total of 10 streams, from a stream #11 to a stream #20, for transmitting/receiving information between the DU #0 320 and the DU #1 330.

The UE 310 transmits a request message which requests a content to the DU #0 320 at operation 415. After receiving the request message from the UE 310, the DU #0 320 determines whether the DU #0 320 currently caches the content which the UE 310 requests, and the DU #0 320 transmits either an IP_ADD message to the UE 310 or the content which the UE 310 requests to the UE 310 according to the determining result. In FIG. 4, it will be assumed that the DU #0 320 does not cache the content which the UE 310 requests, and the DU #1 330 caches the content which the UE 310 requests. Since the DU #0 320 does not cache the content which the UE 310 requests, the DU #0 320 determines a node which will process the content request of the UE 310 by using a general content request processing scheme, e.g., a distributed hash scheme, or a table managing scheme, and the like.

The DU #0 320 includes an IP address of a DU which caches the content which the UE 310 requests, i.e., the DU #1 330, into the IP_ADD message to transmit the IP_ADD message to the UE 310 at operation 417. The IP_ADD message may include a binding policy.

Change of an SCTP connection for each of the UE 310, the DU #0 320, and the DU #1 330, will be described below.

Firstly, change of an SCTP connection for the UE 310 will be described.

The UE 310 receives the IP address of the DU #1 330 through the IP_ADD message from the DU #0 320, so the UE 310 adds the IP address of the DU #1 330 to a destination IP address at operation 419. For convenience, in FIG. 4, it will be noted that the destination IP address is illustrated as "dst IP". The operation of adding the IP address of the DU #1 330 to the destination IP address is supported in a general SCTP standard, so there is no need for an additional operation other than the general SCTP standard in an embodiment of the present disclosure.

Since the IP address of the DU #1 330 is added to the destination IP address, an IP address of the DU #0 320 which has previously been the destination IP address should be temporarily disabled. This is why an SCTP ACK message should not be transmitted to the DU #0 320. That is, in the general SCTP standard, even though there are two destination IP addresses, a server has only two interfaces, that is, the server establishes two SCTP connections, so a use of two destination IP addresses does not matter.

In an embodiment of the present disclosure, although IP addresses of different servers are added to a destination IP address, only one IP address should be used as a destination IP address during a preset interval.

Next, change of an SCTP connection for the DU #0 320 will be described below.

After receiving a request message from the UE 310, the DU #0 320 relays the request message to the DU #1 330, since the DU #0 320 does not cache the content which the UE 310 requests, at operation 421. Upon relaying the request message to the DU #1 330, the DU #0 320 selects a specific stream from among a plurality of streams which are established between the DU #0 320 and the DU #1 330. Here, a stream which is used for relaying the request message to the DU #1 330 is an idle stream. The DU #0 320 includes the IP address of the UE 310, i.e., a UE IP address, into the request message.

Next, change of an SCTP connection for the DU #1 330 will be described below.

After receiving the request message from the DU 0 320, the DU #1 330 may detect that a UE which requests a content is the UE 310 by detecting the IP address of the UE 310 included in the request message. The DU #1 330 does not establish a new SCTP connection with the UE 310 in order to transmit a content to the UE 310, and temporarily changes a use of the SCTP stream through which the request message is transmitted for a communication between the DU #1 330 and the UE 310.

In order to temporarily change the use of the SCTP stream through which the request message is transmitted for the communication between the DU #1 330 and the UE 310, there is a need for information for the use change; the DU #1 330 should therefore temporarily change a stream number of a stream which will be used for the communication between the DU #1 330 and the UE 310 to a stream number which the UE 310 recognizes. The DU #1 330 should reconfigure (temporarily change) an SCTP sequence number to an SCTP sequence number which the UE 310 recognizes at operation 423.

According that the stream number of the stream is temporarily changed to the stream number which the UE 310 recognizes and the SCTP sequence number is temporarily changed to the SCTP sequence number which the UE 310 recognizes, a virtual SCTP connection is established between the UE 310 and the DU #1 330 at operation 425.

The DU #1 330 transmits data which the UE 310 requests through the virtual SCTP connection which is established between the DU #1 330 and the UE 310, i.e., a related stream at operation 427.

If transmission of the data which the UE 310 requests is ended, the DU #1 330 notifies to the DU #0 320 that the transmission of the data which the UE 310 requests is ended at operation 429, and notifies to the UE 310 that the transmission of the data which the UE 310 requests is ended at operation 433.

After the DU #1 330 notifies to the DU #0 320 that the transmission of the data which the UE 310 requests is ended, the DU #0 320 recognizes that a stream corresponding to a stream number 11 which is not used due to temporary use change may be re-used at operation 431.

The DU #1 330 changes a setting of an SCTP stream which the DU #1 330 uses with the UE 310 to a previous setting, that is, a setting which has been changed in order to transmit the content which the UE 310 requests.

Since the transmission of the content which the UE 310 requests is ended, the UE 310 deletes the IP address of the DU #1 330 from the destination IP address, and changes a state of the SCTP stream to a state in which the UE 310 may perform a data communication with the DU #0 320.

As a result, after the content transmission from the DU #1 330 to the UE 310 is completed, a state of an SCTP stream is returned to an original connection state.

A 'UE stream #1 marking' setting operation in FIG. 4 will be described below.

At the UE 310 side, full content transmission to the DU #0 320 is ended, a sequence number of a related stream is increased to a preset value. In FIG. 4, a sequence number of the UE 310 is increased to "77". If the UE 310 requests the next object to the DU #0 320, the DU #0 320 may detect that the sequence number of the UE 310 has been increased compared to a previous sequence number, so the UE 310 should control the DU #0 320 not to perform an abnormal operation.

The DU #0 320 sets 'UE stream #1 marking' in order to recognize that the DU #0 320 may use a random sequence number for transmitting a new object to the UE 310.

The DU #0 320 may recognize that a new sequence number is allocated to a new request message for a related stream.

The DU #0 320 may recognize that the DU #0 320 may use a random sequence number in order to transmit the new object to the UE 310 using an alternative method different from the aforementioned method, and this may be possible by notifying a final sequence number from the DU #1 330 to the DU #0 320 or notifying the final sequence number from the UE 310 to the DU #0 320 when content transmission is completed.

That is, the DU #0 320 may recognize that the DU #0 320 may use the random sequence number in order to transmit the new object to the UE 310 by notifying the final sequence number from the DU #1 330 to the DU #0 320 or notifying the final sequence number from the UE 310 to the DU #0 320.

Although FIG. 4 illustrates a signal transmitting/receiving process among a UE 310, a DU #0 320, and a DU #1 330 according to a process of transmitting a content in a mobile content network in FIG. 3, various changes could be made to FIG. 4. For example, although shown as a series of operations, various operations in FIG. 4 could overlap, occur in parallel, occur in a different order, or occur multiple times.

A signal transmitting/receiving process among a UE 310, a DU #0 320, and a DU #1 330 according to a process of transmitting a content in a mobile content network in FIG. 3 has been described with reference to FIG. 4, and another example of a process of transmitting a content in a mobile content network according to an embodiment of the present disclosure will be described with reference to FIGS. 5A to 5B.

Figure 5A:
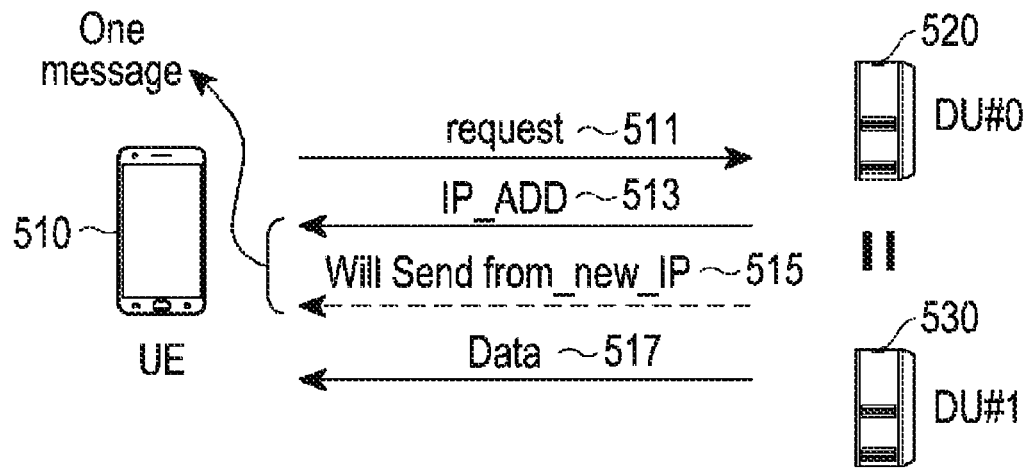
FIG. 5A schematically illustrates another example of a process of transmitting a content in a case that a UE is considered in a mobile content network according to an embodiment of the present disclosure.

FIG. 5A schematically illustrates another example of a process of transmitting a content in a case that a UE is considered in a mobile content network according to an embodiment of the present disclosure.

Referring to FIG. 5A, the mobile content network includes a user device 510, a DU #0 520, and a DU #1 530.

The UE 510 transmits a request message to the DU #0 520 at operation 511, receives an SCTP connection re-establishment message at operations 513 and 515, and receives data corresponding to a content at operation 517. Even though the UE 510 receives the data from the DU #1 530, the DU #0 520 and the DU #1 530 are regarded as one entity from the view of the UE 510. That is, the DU #0 520 and the DU #1 530 are regarded as one entity which has two interfaces, not two different entities.

Although FIG. 5A illustrates another example of a process of transmitting a content in a case that a UE is considered in a mobile content network according to an embodiment of the present disclosure, various changes could be made to FIG. 5A. For example, although shown as a series of operations, various operations in FIG. 5A could overlap, occur in parallel, occur in a different order, or occur multiple times.

Another example of a process of transmitting a content in a case that a UE is considered in a mobile content network according to an embodiment of the present disclosure has been described with reference to FIG. 5A, and another example of a process of transmitting a content in a case that a DU #1 is considered in a mobile content network according to an embodiment of the present disclosure will be described with reference to FIG. 5B.

Figure 5B:
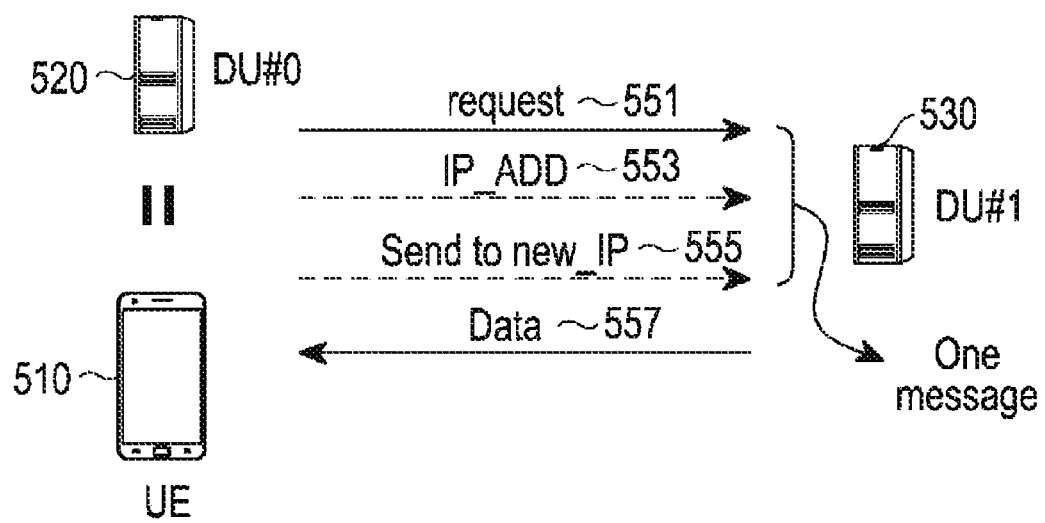
FIG. 5B schematically illustrates another example of a process of transmitting a content in a case that a DU #1 is considered in a mobile content network according to an embodiment of the present disclosure.

FIG. 5B schematically illustrates another example of a process of transmitting a content in a case that a DU #1 is considered in a mobile content network according to an embodiment of the present disclosure.

Referring to FIG. 5B, the mobile content network includes a UE 510, a DU #0 520, and a DU #1 530.

The DU #1 530 receives a request message from the DU #0 520 at operation 551, receives an SCTP connection re-establishment message at operations 553 and 555, and transmits data corresponding to a content to the UE 510 through an SCTP connection re-establishment at operation 557. The DU #1 530 regards the DU #0 520 and the UE 510 as one entity which has two interfaces, not two different entities.

As described in FIGS. 5A and 5B, in a mobile content network according to an embodiment of the present disclosure, three entities, i.e., the UE 510, the DU #0 520, and the DU #1 530, independently operate, thereby enabling content transmission. In this case, different two entities are regarded as one entity, so a virtualization function may be implemented.

Although FIG. 5B illustrates another example of a process of transmitting a content in a case that a DU #1 is considered in a mobile content network according to an embodiment of the present disclosure, various changes could be made to FIG. 5B. For example, although shown as a series of operations, various operations in FIG. 5B could overlap, occur in parallel, occur in a different order, or occur multiple times.

Another example of a process of transmitting a content in a case that a DU #1 is considered in a mobile content network according to an embodiment of the present disclosure has been described with reference to FIG. 5B, and a still another example of a process of transmitting a content in a mobile content network according to an embodiment of the present disclosure will be described with reference to FIG. 6.

Figure 6:
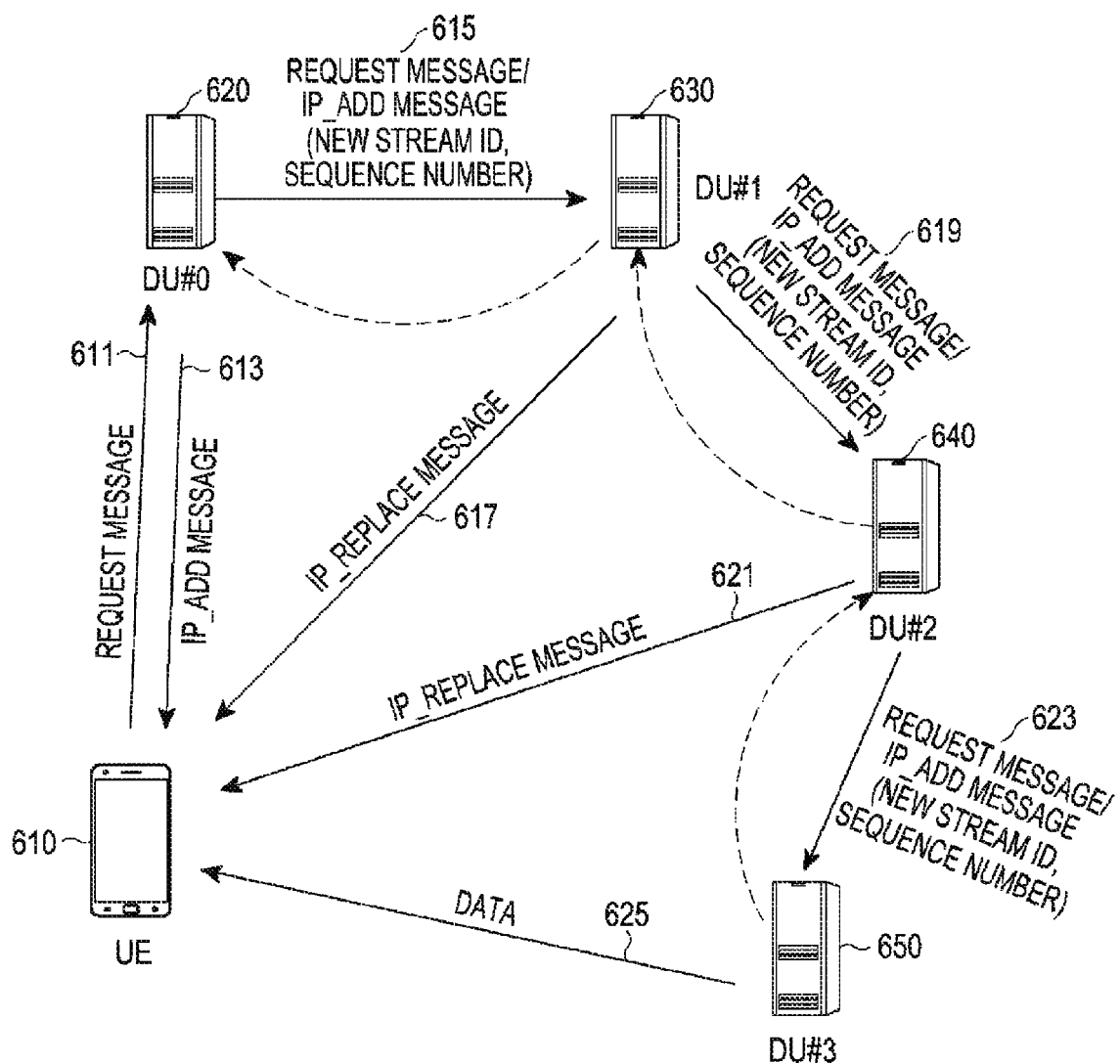
FIG. 6 schematically illustrates still another example of a process of transmitting a content in a mobile content network according to an embodiment of the present disclosure.

FIG. 6 schematically illustrates still another example of a process of transmitting a content in a mobile content network according to an embodiment of the present disclosure.

Referring to FIG. 6, the mobile content network includes a UE 610, a DU #0 620, a DU #1 630, a DU #2 640, and a DU #3 650. Each of the DU #0 620, the DU #1 630, the DU #2 (640), and the DU #3 (650) may be an S-GW or a CDN.

If the UE 610 wants to receive an arbitrary content in a state that the UE 610 accesses the DU #0 620, the UE 610 transmits a request message indicating that the UE 610 requests the content to the DU #0 620 at operation 611. After receiving the request message from the UE 610, the DU #0 620 determines whether the DU #0 620 caches the content which the UE 610 requests, and transmits either an IP_ADD message to the UE 610 or the content which the UE 610 requests according to the determining result.

Referring to FIG. 6, it will be assumed that the DU #0 620 does not currently cache the content which the UE 610 requests, and the DU #3 650 caches the content which the UE 610 requests. Since the DU #0 620 does not cache the content which the UE 310 requests, the DU #0 620 determines a node which will process the content request of the UE 610 using a general content request processing scheme, e.g., a distributed hash scheme, or a table managing scheme, and the like.

It will be assumed that the DU #0 620 determines a node which is expected to cache the content which the UE 610 requests as the DU #1 630. The DU #1 630 is a server which is geographically closest to an original content server, i.e., a server to which the UE 610 requests the content, i.e., the DU #0 620. This is why a cache probability increases since the closer the node which is expected to cache the content which the UE 610 requests is to an original content server, the more the request for the content is aggregated.

If a final cache miss occurs while a request message is routed in order of closest geographically to the original content server, the request message is re-transmitted to the original content server. If a content server uses a scheme which is proposed in an embodiment of the present disclosure, the content server is searched by re-performing the scheme. Alternatively, if the content server does not use the scheme, the content server is searched using a HTTP redirection scheme.

The DU #0 620 includes an IP address of a DU which is expected to cache the content which the UE 610 requests, i.e., the DU #1 630 into the IP_ADD message to transmit the IP_ADD message to the UE 610 at operation 613. Here, the IP_ADD message may include a binding policy. After receiving the IP_ADD message from the DU #0 620, the UE 610 updates an SCTP connection using the IP address included in the IP_ADD message, i.e., the IP address of the DU #1 630. The UE 610 which receives the IP_ADD message from the DU #0 620 may transmit an ACK message to the IP_ADD message as necessary, however, it will be assumed here that the UE 610 does not transmit the ACK message in response to the IP_ADD message.

After transmitting the IP_ADD message to the UE 610, the DU #0 620 transmits an IP_ADD message to the DU #1 630 at operation 615. Here, the IP_ADD message transmitted from the DU #0 620 to the DU #1 630 is a message which is transmitted in order that the DU #1 630 transmits a content to the UE 610, and includes a request message, an IP address of the UE 610, i.e., a UE_IP address of the UE 610, a new stream ID, and a sequence number.

After receiving the IP_ADD message from the DU #0 620, the DU #1 630 determines whether the DU #1 630 caches the content which the UE 610 requests, and transmits either an IP_ADD message or the content which the UE 610 requests to the UE 610 according to the determining result. Since the DU #1 630 does not cache the content which the UE 610 requests, that is, the DU #3 650 caches the content which the UE 610 requests, the DU #3 650 determines a node which will process the content request of the UE 610 by using a general content request processing scheme, e.g., a distributed hash scheme, or a table managing scheme, and the like.

It will be assumed here that the DU #1 630 determines a node which is expected to cache the content which the UE 610 requests as the DU #2 640. The DU #2 640 is a server which is geographically closest to an original content server, i.e., a server to which the UE 610 requests the content, i.e., the DU #0 620.

Even though the DU #1 630 is the server which is geographically closest to the original content server, the DU #1 630 determines that the DU #1 630 does not currently cache the content which the UE 610 requests, so the DU #1 630 determines a server which is geographically closest to the DU #0 620 except for the DU #1 630, i.e., the DU #2 640 as a node which is expected to cache the content which the UE 610 requests.

So, the DU #1 630 includes an IP address of a DU which is expected to cache the content which the UE 610 requests, i.e., the DU #2 640 into an IP_REPLACE message to transmit the IP_REPLACE message to the UE 610 at operation 617. Here, the IP_REPLACE message indicates that an IP address of an SCTP connection will be changed from the IP address of the DU #1 630 to the IP address of the DU #2 640. After receiving the IP_REPLACE message from the DU #1 630, the UE 610 updates an SCTP connection using the IP address included in the IP_REPLACE message, i.e., the IP address of the DU #2 640. The UE 610 which receives the IP_REPLACE message from the DU #1 630 may transmit an ACK message to the IP_REPLACE message as necessary, however, it will be assumed here that the UE 610 does not transmit the ACK message in response to the IP_REPLACE message.

After transmitting the IP_REPLACE message to the UE 610, the DU #1 630 transmits an IP_ADD message to the DU #2 640 at operation 619. Here, the IP_ADD message transmitted from the DU #1 630 to the DU #3 640 is a message which is transmitted in order that the DU #2 640 transmits a content to the UE 610, and includes a request message, an IP address of the UE 610, i.e., a UE_IP address of the UE 610, a new stream ID, and a sequence number.

After receiving the IP_ADD message from the DU #1 630, the DU #2 640 determines whether the DU #2 640 currently caches the content which the UE 610 requests, and transmits an IP_REPLACE message or the content which the UE 610 requests to the UE 610 according to the determining result. Since the DU #2 640 does not cache the content which the UE 610 requests, that is, the DU #3 650 caches the content which the UE 610 requests, the DU #3 650 determines a node which will process the content request of the UE 610 using a general content request processing scheme, e.g., a distributed hash scheme, or a table managing scheme, and the like.

It will be assumed here that the DU #2 640 determines the node which is expected to cache the content which the UE 610 requests as the DU #3 650. The DU #3 650 is a server which is geographically closest to the original content server, i.e., a server to which the UE 610 requests the content (i.e., the DU #0 620). Even though the DU #1 630 and the DU #2 640 are the servers which are geographically closest to the DU #0 620, the DU #2 640 determines that the DU #2 640 does not cache the content which the UE 610 requests, so the DU #2 640 determines a server which is geographically closest to the DU #0 620 except for the DU #1 630 and DU #2 640, i.e., the DU #3 650 as a node which is expected to cache the content which the UE 610 requests.

The DU #2 640 includes an IP address of a DU which is expected to cache the content which the UE 610 requests, i.e., the DU #3 650, into an IP_REPLACE message to transmit the IP_REPLACE message to the UE 610 at operation 621. Here, the IP_REPLACE message indicates that an IP address of an SCTP connection will be changed from the IP address of the DU #2 640 to the IP address of the DU #3 650. After receiving the IP_REPLACE message from the DU #2 640, the UE 610 updates an SCTP connection using the IP address included in the IP_REPLACE message, i.e., the IP address of the DU #3 650. The UE 610 which receives the IP_REPLACE message from the DU #2 640 may transmit an ACK message to the IP_REPLACE message as necessary, however, it will be assumed here that the UE 610 does not transmit the ACK message in response to the IP_REPLACE message.

After transmitting the IP_REPLACE message to the UE 610, the DU #2 640 transmits an IP_ADD message to the DU #3 650 at operation 623. Here, the IP_ADD message transmitted from the DU #2 640 to the DU #3 650 is a message which is transmitted in order that the DU #3 650 transmits a content to the UE 610, and includes a request message, an IP address of the UE 610, i.e., a UE_IP address of the UE 610, a new stream ID, and a sequence number.

After receiving the IP_ADD message from the DU #2 640, the DU #3 650 determines whether the DU #3 650 caches the content which the UE 610 requests, and transmits an IP_REPLACE message to the UE 610 or the content which the UE 610 requests to the UE 610 according to the determining result. In FIG. 6, the DU #3 650 caches the content which the UE 610 requests, so the DU #3 650 temporarily changes a use of an SCTP stream which is used for a data communication between the DU #3 650 and the DU #2 640, and transmits a content, i.e., data, to the UE 610 using the SCTP stream of which the use is changed at operation 625.

Although FIG. 6 illustrates still another example of a process of transmitting a content in a mobile content network according to an embodiment of the present disclosure, various changes could be made to FIG. 6. For example, although shown as a series of operations, various operations in FIG. 6 could overlap, occur in parallel, occur in a different order, or occur multiple times.

Still another example of a process of transmitting a content in a mobile content network according to an embodiment of the present disclosure has been described with reference to FIG. 6, and a signal transmitting/receiving process among a UE 610, a DU #0 620, a DU #1 630, and a DU #2 640 according to a process of transmitting a content in a mobile content network in FIG. 6 will be described with reference to FIG. 7.

Figure 7:
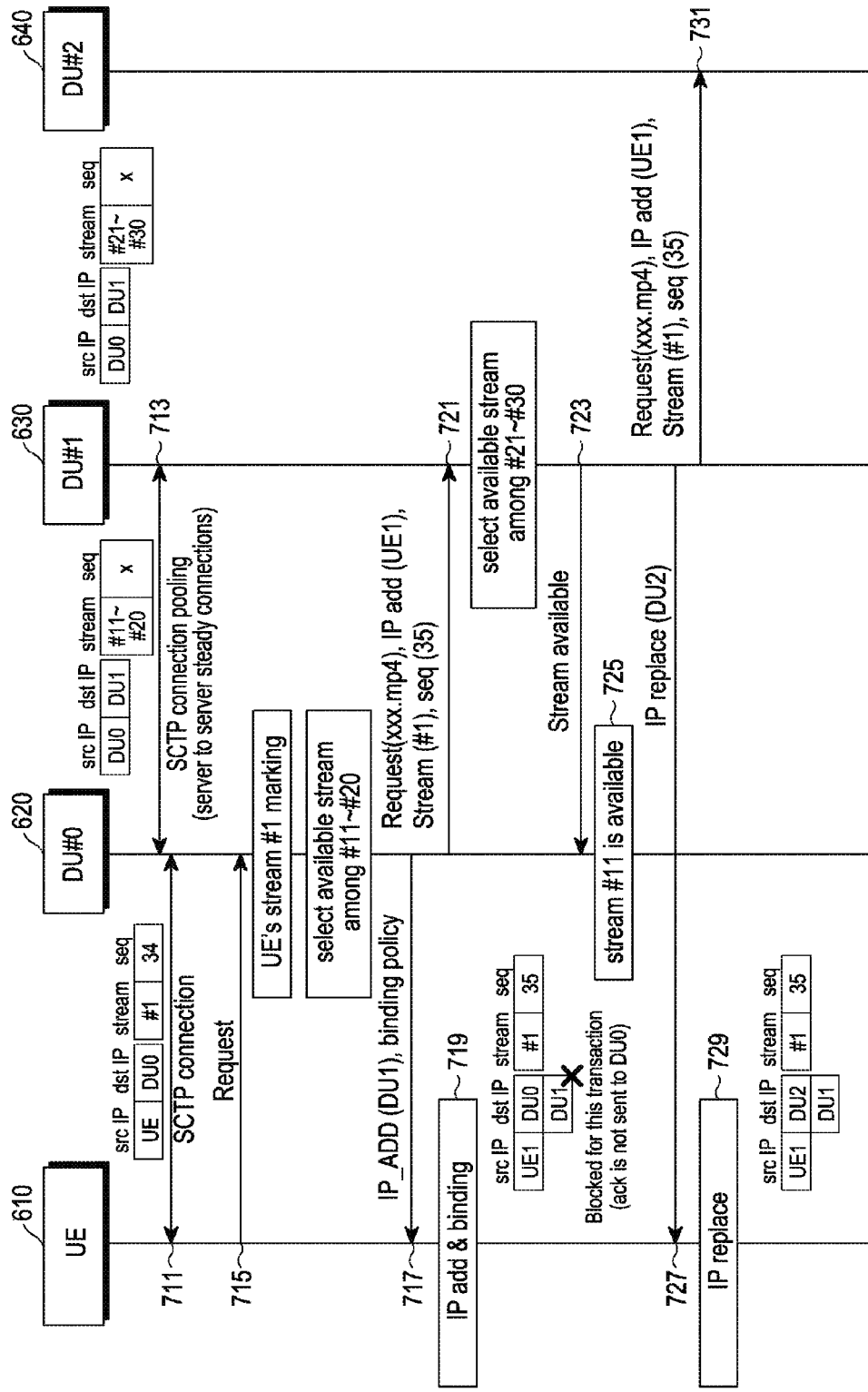
FIG. 7 schematically illustrates a signal transmitting/receiving process among a UE, a DU, a second DU, and a third DU according to a process of transmitting a content in a mobile content network in FIG. 6 according to an embodiment of the present disclosure.

FIG. 7 schematically illustrates a signal transmitting/receiving process among a UE 610, a DU #0 620, a DU #1 630, and a DU #2 640 according to a process of transmitting a content in a mobile content network in FIG. 6 according to an embodiment of the present disclosure.

Referring to FIG. 7, before a content request by the UE 610 occurs, an SCTP connection between the UE 610 and the DU #0 620 has been already established at operation 711, and an SCTP connection between the DU #0 620 and the DU #1 630 has been already established at operation 713. Since there is much information which is transmitted/received between the DU #0 620 and the DU #1 630, the DU #0 620 and the DU #1 630 will have a plurality of established streams for mutually transmitting/receiving information. In FIG. 7, it will be assumed that there are a total of 10 streams, from a stream #11 to a stream #20, for transmitting/receiving information between the DU #0 620 and the DU #1 630.

The UE 610 transmits a request message which requests a content of the DU #0 620 at operation 715. After receiving the request message from the UE 610, the DU #0 620 determines whether the DU #0 620 currently caches the content which the UE 610 requests, and the DU #0 620 transmits either an IP_ADD message to the UE 610 or the content which the UE 610 requests to the UE 610 according to the determining result. In FIG. 7, it will be assumed that the DU #0 620 does not cache the content which the UE 610 requests, and a DU #3 650 (not shown in FIG. 7) caches the content which the UE 610 requests. Since the DU #0 620 does not cache the content which the UE 610 requests, the DU #0 620 determines a node which will process the content request of the UE 610 using a general content request processing scheme, e.g., a distributed hash scheme, or a table managing scheme, and the like.

The DU #0 620 includes an IP address of a DU which is expected to cache the content which the UE 610 requests, i.e., the DU #1 630, into the IP_ADD message to transmit the IP_ADD message to the UE 610 at operation 717. The IP_ADD message may include a binding policy.

The UE 610 receives the IP address of the DU #1 630 through the IP_ADD message from the DU #0 620, so the UE 610 adds the IP address of the DU #1 630 to a destination IP address at operation 719. For convenience, in FIG. 7, it will be noted that the destination IP address is illustrated as "dst IP". The operation of adding the IP address of the DU #1 630 to the destination IP address is supported in a general SCTP standard, so there is no need for an additional operation other than the general SCTP standard in an embodiment of the present disclosure.

Since the IP address of the DU #1 630 is added to the destination IP address, an IP address of the DU #0 620 which has been the destination IP address should be temporarily disabled. This is why an SCTP ACK message should not be transmitted to the DU #0 620. That is, in the general SCTP standard, even though there are two destination IP addresses, a server has only two interfaces, that is, the server establishes two SCTP connections, so a use of two destination IP addresses does not matter.

In an embodiment of the present disclosure, IP addresses of different servers are added to a destination IP address, so only one IP address should be used as a destination IP address during a preset interval.

If the DU #0 620 receives a request message from the UE 610, the DU #0 620 relays the request message to the DU #1 630, since the DU #0 620 does not cache the content which the UE 610 requests, at operation 721. Upon relaying the request message to the DU #1 630, the DU #0 620 selects a specific stream among a plurality of streams which are established between the DU #0 620 and the DU #1 630. Here, a stream which is used for relaying the request message to the DU #1 630 is an idle stream. The DU #0 620 includes the IP address of the UE 610, i.e., a UE IP address into the request message.

Referring to FIG. 7, it will be assumed that there are a total of 10 streams, from a stream #21 to a stream #30, for transmitting/receiving information between the DU #1 630 and the DU #2 640. Since the DU #1 630 does not cache the content which the UE 610 requests, the DU #1 630 transmits a stream available message, indicating that a stream is available, to the DU #0 620 at operation 723. After receiving the stream available message from the DU #1 630, the DU #0 620 recognizes that a stream corresponding to a stream number 11, which is not used due to temporary use change, may be used again at operation 725.

After receiving the request message from the DU #0 620, the DU #1 630 determines whether the DU #1 630 caches the content which the UE 610 requests, and transmits either an IP_REPLACE message or the content which the UE 610 requests to the UE 610 according to the determining result. In FIG. 7, it is assumed that the DU #1 630 does not cache the content which the UE 610 requests, and the DU #3 650 cashes the content which the UE 610 requests. The DU #0 620 determines a node which will process the content request of the UE 610 by using a general content request processing scheme, e.g., a distributed hash scheme, or a table managing scheme, and the like.

The DU #1 630 includes an IP address of a DU which is expected to cache the content which the UE 610 requests, i.e., the DU #2 640 into the IP_REPLACE message to transmit the IP_REPLACE message to the UE 610 at operation 727.

Since the UE 610 receives the IP address of the DU #2 640 from the DU #1 630 through the IP_REPLACE message, the UE 610 replaces the IP address of the DU #1 630, which has been added to a destination IP address, with the IP address of the DU #2 640 at operation 729. Since IP address of the DU #2 640 is added to the destination IP address, the IP address of the DU #0 620 which has been the destination IP address should be temporarily disabled.

This is why an SCTP ACK message should not be transmitted to the DU #2 640. That is, in the general SCTP standard, even though there are two destination IP addresses, a server has only two interfaces, that is, the server establishes two SCTP connections, so a use of two destination IP addresses does not matter.

In an embodiment of the present disclosure, although IP addresses of different servers are added to a destination IP address, only one IP address should be used as a destination IP address during a preset interval.

After the DU #1 transmits the IP_REPLACE message to the UE 610, the DU #1 630 relays the request message to the DU #2 640, since the DU #1 630 does not cache the content which the UE 610 requests, at operation 731.

An operation after operation 731 is similar to the aforementioned operations, so a detailed description will be omitted herein.

Further, a 'UE stream #1 marking' setting operation in FIG. 7 will be described below.

As described in FIG. 4, the DU #0 620 performs the 'UE stream #1 marking' setting operation in order to recognize that a new sequence number should be started for a related stream if a new request message is received. As described in FIG. 4, in order to recognize what is the last sequence number of the related stream, the UE 610 should report the last sequence number to the DU #0 620 or the DU #1 630 should report the last sequence number to the DU #0 620.

The operation of reporting the last sequence number from the DU #1 630 to the DU #0 620 will be described below.

In a case that the request message is routed from the DU #1 630 to the DU #2 640 again, the DU #1 630 may accurately know the last sequence number only if the last sequence number should be reported again from the DU #2 640. In this case, the last sequence number is reported from the DU #2 640 to the DU #1 630, the DU #1 630 may transmit the last sequence number to the DU #0 620, or the DU #2 640 may report the last sequence number to the DU #0 620. If the DU #2 640 directly reports the last sequence number to the DU #0 620, the DU #2 640 should previously know that a basic DU which processes the content request of the UE 610 is the DU #0 620. So, this information should be transmitted along with the request message if the request message is routed.

Although FIG. 7 illustrates a signal transmitting/receiving process among a UE 610, a DU #0 620, a DU #1 630, and a DU #2 640 according to a process of transmitting a content in a mobile content network in FIG. 6, various changes could be made to FIG. 7. For example, although shown as a series of operations, various operations in FIG. 7 could overlap, occur in parallel, occur in a different order, or occur multiple times.

A signal transmitting/receiving process among a UE 610, a DU #0 620, a DU #1 630, and a DU #2 640 according to a process of transmitting a content in a mobile content network in FIG. 6 has been described with reference to FIG. 7, and an inner structure of a UE in a mobile content network according to an embodiment of the present disclosure will be described with reference to FIG. 8.

Figure 8:
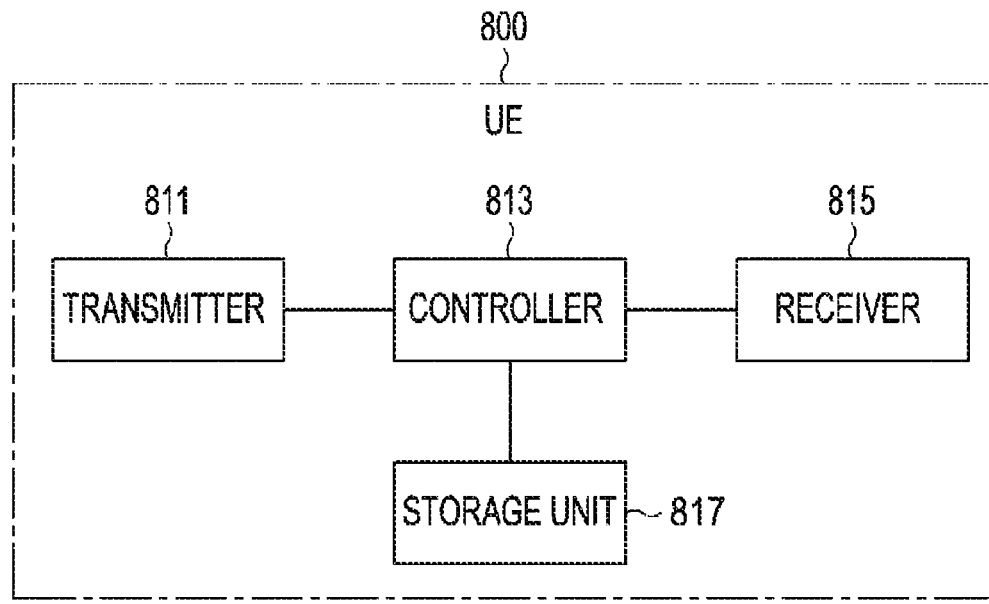
FIG. 8 schematically illustrates an inner structure of a UE in a mobile content network according to an embodiment of the present disclosure.

FIG. 8 schematically illustrates an inner structure of a UE in a mobile content network according to an embodiment of the present disclosure.

Referring to FIG. 8, a UE 800 includes a transmitter 811, a controller 813, a receiver 815, and a storage unit 817.

The controller 813 controls the overall operation of the UE 800. More particularly, the controller 813 controls the UE 800 to perform an operation related to an operation of transmitting a content. The operation related to the operation of transmitting the content is performed in the manner described with reference to FIGS. 3 to 7, and a description thereof will not be repeated herein.

The transmitter 811 transmits various messages, and the like to a DU, an S-GW, or a CDN node under a control of the controller 813. The various messages, and the like transmitted in the transmitter 811 have been described in FIGS. 3 to 7 and a description thereof will not be repeated herein.

The receiver 815 receives various messages, and the like from the DU, the S-GW, or the CDN node under a control of the controller 813. The various messages, and the like received in the receiver 815 have been described in FIGS. 3 to 7 and a description thereof will not be repeated herein.

The storage unit 817 stores a program, various data, and the like necessary for the operation of the UE 800, specially, the operation related to the operation of transmitting the content. The storage unit 817 stores the various messages, and the like received in the receiver 815.

While the transmitter 811, the controller 813, the receiver 815, and the storage unit 817 are described as separate processors, it is to be understood that this is merely for convenience of description. In other words, two or more of the transmitter 811, the controller 813, the receiver 815, and the storage unit 817 may be incorporated into a single processor. Similarly, functions of a unit described herein may be divided among two or more units.

An inner structure of a UE in a mobile content network according to an embodiment of the present disclosure has been described with reference to FIG. 8, and an inner structure of a DU in a mobile content network according to an embodiment of the present disclosure will be described with reference to FIG. 9.

Figure 9:
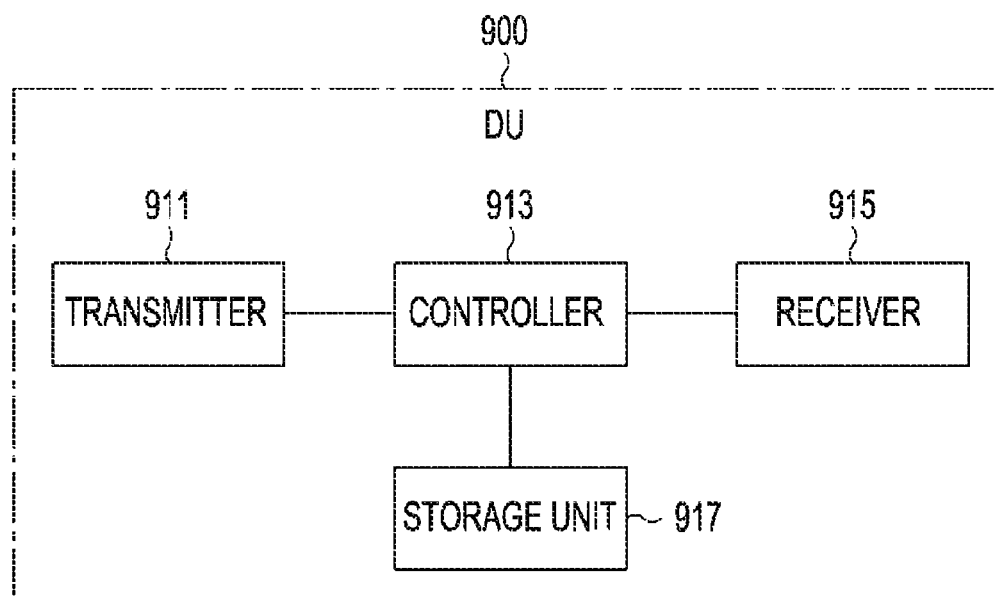
FIG. 9 schematically illustrates an inner structure of a DU in a mobile content network according to an embodiment of the present disclosure.

FIG. 9 schematically illustrates an inner structure of a DU in a mobile content network according to an embodiment of the present disclosure.

Referring to FIG. 9, a DU 900 includes a transmitter 911, a controller 913, a receiver 915, and a storage unit 917.

The controller 913 controls the overall operation of the DU 900. More particularly, the controller 913 controls the DU 900 to perform an operation related to an operation of transmitting a content. The operation related to the operation of transmitting the content is performed in the manner described with reference to FIGS. 3 to 7 and a description thereof will not be repeated herein.

The transmitter 911 transmits various messages, and the like to a UE, other DU, an S-GW, and a CDN node under a control of the controller 913. The various messages, and the like transmitted in the transmitter 911 have been described in FIGS. 3 to 7 and a description thereof will not be repeated herein.

The receiver 915 receives various messages, and the like from the UE, the other DU, the S-GW, and the CDN node under a control of the controller 913. The various messages, and the like received in the receiver 915 have been described in FIGS. 3 to 7 and a description thereof will not be repeated herein.

The storage unit 917 stores a program, various data, and the like necessary for the operation of the DU 900, specially, the operation related to the operation of transmitting the content. The storage unit 917 stores the various messages, and the like received in the receiver 915.

While the transmitter 911, the controller 913, the receiver 915, and the storage unit 917 are described as separate processors, it is to be understood that this is merely for convenience of description. In other words, two or more of the transmitter 911, the controller 913, the receiver 915, and the storage unit 917 may be incorporated into a single processor. Similarly, functions of a unit described herein may be divided among two or more units.

An inner structure of a DU in a mobile content network according to an embodiment of the present disclosure has been described with reference to FIG. 9, and an inner structure of an S-GW (not shown) in a mobile content network according to an embodiment of the present disclosure will be described below.

The S-GW includes a transmitter, a controller, a receiver, and a storage unit.

The controller controls the overall operation of the S-GW. More particularly, the controller controls the S-GW to perform an operation related to an operation of transmitting a content. The operation related to the operation of transmitting the content is performed in the manner described with reference to FIGS. 3 to 7 and a description thereof will not be repeated herein.

The transmitter transmits various messages, and the like to a UE, a DU, other S-GW, and a CDN node under a control of the controller. The various messages, and the like transmitted in the transmitter have been described in FIGS. 3 to 7 and a description thereof will not be repeated herein.

The receiver receives various messages, and the like from the UE, the DU, the other S-GW, and the CDN node under a control of the controller. The various messages, and the like received in the receiver have been described in FIGS. 3 to 7 and a description thereof will not be repeated herein.

The storage unit stores a program, various data, and the like necessary for the operation of the S-GW, specially, the operation related to the operation of transmitting the content. The storage unit stores the various messages, and the like received in the receiver.

While the transmitter, the controller, the receiver, and the storage unit are described as separate processors, it is to be understood that this is merely for convenience of description. In other words, two or more of the transmitter, the controller, the receiver, and the storage unit may be incorporated into a single processor. Similarly, functions of a unit described herein may be divided among two or more units.

An inner structure of an S-GW in a mobile content network according to an embodiment of the present disclosure has been described above, and an inner structure of a CDN (not shown) in a mobile content network according to an embodiment of the present disclosure will be described below.

The CDN node includes a transmitter, a controller, a receiver, and a storage unit.

The controller controls the overall operation of the CDN node. More particularly, the controller controls the CDN node to perform an operation related to an operation of transmitting a content. The operation related to the operation of transmitting the content is performed in the manner described with reference to FIGS. 3 to 7 and a description thereof will not be repeated herein.

The transmitter transmits various messages, and the like to a UE, a DU, an S-GW, and other CDN node under a control of the controller. The various messages, and the like transmitted in the transmitter have been described in FIGS. 3 to 7 and a description thereof will not be repeated herein.

The receiver receives various messages, and the like from the UE, the DU, the S-GW, and the other CDN node under a control of the controller. The various messages, and the like received in the receiver have been described in FIGS. 3 to 7 and a description thereof will not be repeated herein.

The storage unit stores a program, various data, and the like necessary for the operation of the CDN node, specially, the operation related to the operation of transmitting the content. The storage unit stores the various messages, and the like received in the receiver.

While the transmitter, the controller, the receiver, and the storage unit are described as separate processors, it is to be understood that this is merely for convenience of description. In other words, two or more of the transmitter, the controller, the receiver, and the storage unit may be incorporated into a single processor. Similarly, functions of a unit described herein may be divided among two or more units.

As is apparent from the foregoing description, an embodiment of the present disclosure thus enables to receive a content without establishing a new TCP connection whenever a UE searches a new host in a mobile content network.

An embodiment of the present disclosure thus enables to reduce overhead which may occur in a mobile content network and a UE and service delay.

An embodiment of the present disclosure thus enables to increase content download speed by removing overhead and service delay in a mobile content network.

Certain aspects of the present disclosure may also be embodied as computer readable code on a non-transitory computer readable recording medium. A computer readable recording medium is any data storage device that can store data, which can be thereafter be read by a computer system. Examples of the computer readable recording medium include Read-Only Memory (ROM), Random-Access Memory (RAM), Compact Disc-ROMs (CD-ROMs), magnetic tapes, floppy disks, optical data storage devices, and data transmitted through the Internet. The computer readable recording medium can also be distributed over network coupled computer systems so that the computer readable code is stored and executed in a distributed fashion. Also, functional programs, code, and code segments for implementing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory Integrated Circuit (IC), or an optically or magnetically recordable non-transitory machine-readable, e.g., computer-readable, storage medium, e.g., a CD, a Digital Versatile Disc (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving data in a user equipment (UE) in a mobile content network, the method comprising:
   transmitting a request message, which requests a content, to a first digital unit (DU);
   receiving an internet protocol (IP) add message, including information of a second DU which caches the requested content, from the first DU;
   updating a stream control transmission protocol (SCTP) connection based on the information of the second DU included in the IP add message; and
   receiving data from the second DU using the updated SCTP connection.

2. The method of claim 1, further comprising:
   transmitting an acknowledgement (ACK) message, as a response message to the IP add message, to the first DU.

3. The method of claim 1, wherein the information on the second DU included in the IP add message includes an IP address of the second DU.

4. The method of claim 1, wherein the IP add message further includes a binding policy.

5. The method of claim 1, wherein the UE receives the IP add message from the first DU and the data from the second DU if the first DU does not cache the requested content.

6. The method of claim 1, wherein the data comprises the requested content.

7. A method for transmitting data in a first digital unit (DU) in a mobile content network, the method comprising:
   receiving a request message, which requests a content, from a user equipment (UE);
   determining whether the first DU caches the requested content;
   transmitting the request message to a second DU being expected to cache the requested content, if the first DU does not cache the requested content; and
   transmitting an internet protocol (IP) add message, including information of the second DU, to the UE.

8. The method of claim 7, further comprising:
   transmitting an IP add message including information of the UE to the second DU.

9. The method of claim 7, further comprising:
   receiving an acknowledgement (ACK) message, as a response message to the IP add message, from the UE.

10. The method of claim 7, wherein the information of the second DU included in the IP add message includes an IP address of the second DU.

11. The method of claim 7, wherein the IP add message further includes a binding policy.

12. The method of claim 8, wherein the IP add message including the information of the UE includes a new stream identifier (ID) and a sequence number.

13. The method of claim 7, wherein the second DU comprises a DU geographically closest to the first DU.

14. A method for transmitting data in a second digital unit (DU) in a mobile content network, the method comprising:
   receiving a request message, which requests a content, from a first DU which receives the request message from a user equipment (UE);
   determining whether the second DU caches the requested content; and
   transmitting the requested content to the UE using a stream control transmission protocol (SCTP) connection updated based on information of the second DU if the second DU caches the requested content.

15. The method of claim 14, further comprising:
receiving an internet protocol (IP) add message, including information of the UE, from the first DU.

16. The method of claim 15, wherein the IP add message includes a new stream (ID) and a sequence number.

17. The method of claim 14, wherein the second DU receives the request message and transmits the content if the first DU does not cache the requested content.

18. The method of claim 14, wherein if the second DU does not cache the requested content, the second DU transmits the request message to a third DU comprising a DU geographically closest to the first DU other than the second DU.

19. A user equipment (UE) in a mobile content network, the UE comprising:
a transmitter configured to transmit a request message, which requests a content, to a first digital unit (DU);
a receiver configured to receive an internet protocol (IP) add message, including information of a second DU which caches the requested content, from the first DU; and
a controller configured to update a stream control transmission protocol (SCTP) connection based on the information of the second DU included in the IP add message,
wherein the receiver receives data from the second DU using the updated SCTP connection.

20. The UE of claim 19, wherein the transmitter transmits an acknowledgement (ACK) message, as a response message to the IP add message, to the first DU.

21. The UE of claim 19, wherein the information of the second DU included in the IP add message includes an IP address of the second DU.

22. The UE of claim 19, wherein the IP add message further includes a binding policy.

23. The UE of claim 19, wherein the UE receives the IP add message from the first DU and the data from the second DU if the first DU does not cache the requested content.

24. The UE of claim 19, wherein the data comprises the requested content.

25. A first digital unit (DU) in a mobile content network, the first DU comprising:
a receiver configured to receive a request message, which requests a content, from a user equipment (UE);
a controller configured to determine whether the first DU caches the requested content;
a controller configured to transmit the request message to a second DU being expected to cache the requested content, if the first DU does not cache the requested content, and to transmit an internet protocol (IP) add message, including information of the second DU, to the UE.

26. The first DU of claim 25, wherein the transmitter transmits an IP add message including information of the UE to the second DU.

27. The first DU of claim 25, wherein the receiver receives an acknowledgement (ACK) message, as a response message to the IP add message, from the UE.

28. The first DU of claim 25, wherein the information of the second DU included in the IP add message includes an IP address of the second DU.

29. The first DU of claim 25, wherein the IP add message further includes a binding policy.

30. The first DU of claim 26, wherein the IP add message including the information of the UE includes a new stream identifier (ID) and a sequence number.

31. The first DU of claim 25, wherein the second DU comprises a DU geographically closest to the first DU.

32. A second digital unit (DU) in a mobile content network, the second DU comprising:
a receiver configured to receive a request message, which requests a content, from a first DU which receives the request message from a user equipment (UE);
a controller configured to determine whether the second DU caches the requested content; and
a transmitter configured to transmit the requested content to the UE using a stream control transmission protocol (SCTP) connection updated based on information of the second DU if the second DU caches the requested content.

33. The second DU of claim 32, wherein the receiver receives an internet protocol (IP) add message including information of the UE from the first DU.

34. The second DU of claim 33, wherein the IP add message includes a new stream identifier (ID) and a sequence number.

35. The second DU of claim 32, wherein the second DU receives the request message and transmits the content if the first DU does not cache the requested content.

36. The second DU of claim 32, wherein if the second DU does not cache the requested content, the second DU transmits the request message to a third DU comprising a DU geographically closest to the first DU other than the second DU.

* * * * *